(12) United States Patent
Yasuo (10) Patent No.: US 7,874,173 B2
(45) Date of Patent: Jan. 25, 2011

(54) THERMAL CAPACITOR

(75) Inventor: Akihiro Yasuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 381 days.

(21) Appl. No.: 12/169,459

(22) Filed: Jul. 8, 2008

(65) Prior Publication Data

US 2009/0014546 A1    Jan. 15, 2009

(30) Foreign Application Priority Data

Jul. 9, 2007    (JP)    ............................. 2007-179286

(51) Int. Cl.
*F25D 23/12* (2006.01)
*F25D 17/02* (2006.01)
*F28D 15/00* (2006.01)
*H05K 7/20* (2006.01)

(52) U.S. Cl. .................. 62/259.2; 62/434; 165/104.33; 361/698

(58) Field of Classification Search .................. 62/185, 62/434, 435, 259.2; 236/49.3; 165/104.33; 361/698, 700
See application file for complete search history.

(56) References Cited

U.S. PATENT DOCUMENTS

| 6,397,618 B1 * | 6/2002 | Chu et al. ................... 62/259.2 |
| 7,086,247 B2 * | 8/2006 | Campbell et al. ........... 62/259.2 |
| 7,788,941 B2 * | 9/2010 | Campbell et al. ........... 62/259.2 |

FOREIGN PATENT DOCUMENTS

| JP | B2 3103603 | 9/1992 |
| JP | A 2005-33150 | 2/2005 |

* cited by examiner

*Primary Examiner*—Chen-Wen Jiang
(74) *Attorney, Agent, or Firm*—Greer, Burns & Crain, Ltd.

(57) ABSTRACT

A thermal capacitor cools servers when an active cooling system fails. The thermal capacitor includes cold insulation passages, fans, temperature sensors, and a control unit. The cold insulation passages each have a plurality of air flow channels obtained by dividing the air flow path into a plurality of air flow paths with different air flow path cross-sectional areas. The fan is mounted in each air flow path and the fan controls the air flow of each air flow channel. A temperature sensor is mounted in each outlet of the cold insulation passages. When a detected temperature exceeds a predetermined temperature, the control unit controls air flow so that the ratio of air flow by air flow passage with larger air flow path diameter to overall air flow of all air flow channel increases.

5 Claims, 11 Drawing Sheets

| AIR PASSAGE | WHEN AIR TEMPERATURE IS HIGH | WHEN AIR TEMPERATURE IS LOW |
|---|---|---|
| AIR PASSAGE 30 | 6 | 5 |
| AIR PASSAGE 20 | 8 | 3 |
| AIR PASSAGE 10 | 10 | 1 |

THERMAL CAPACITOR

TECHNICAL FIELD

This invention relates to a thermal capacitor and the usage. The thermal capacitor is mounted in an air flow path within a rack where an entity such as a computer (calculator) subject to be cooled is located, and the thermal capacitor cools air thereby cools the entity.

Figure 10:
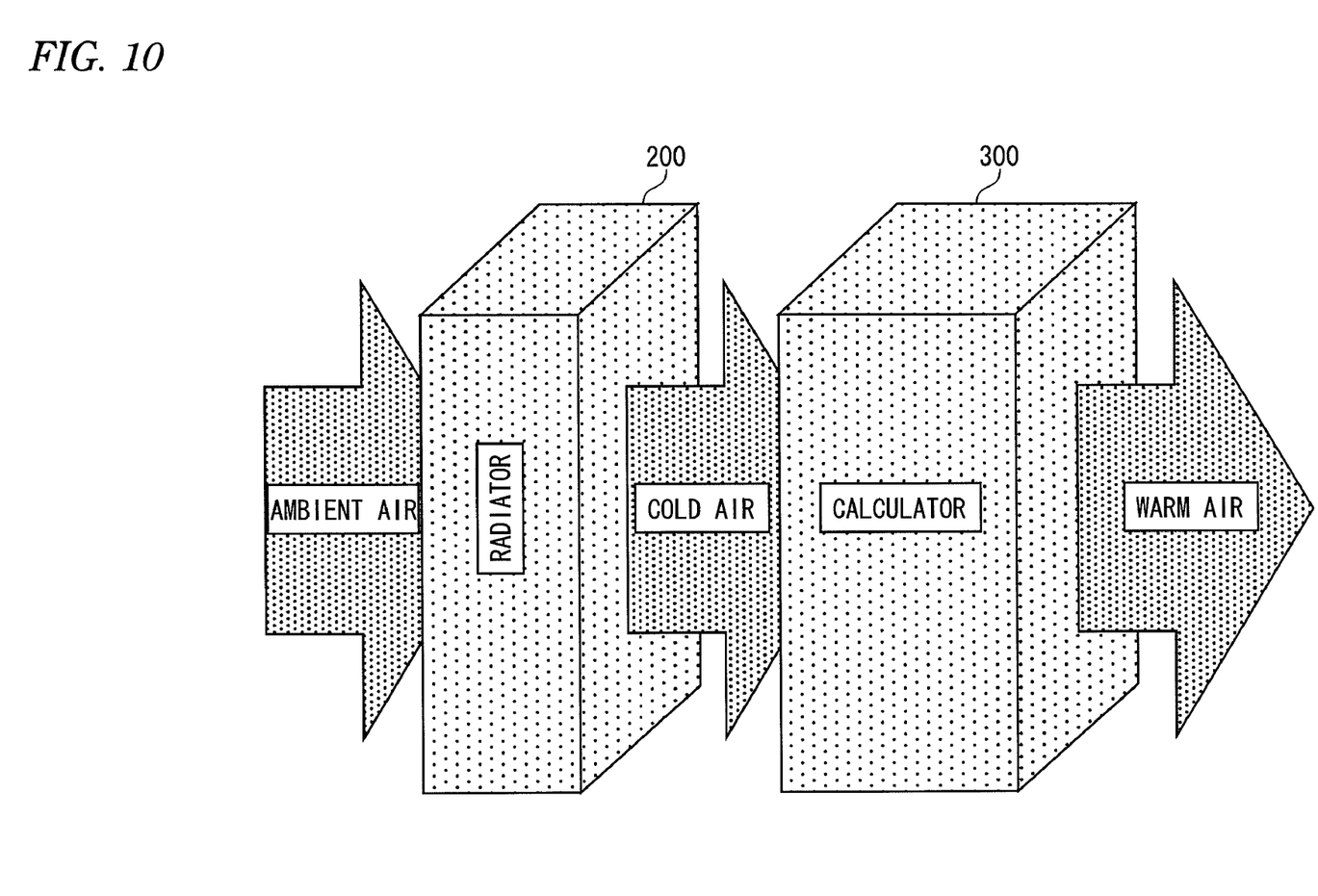
FIG. 10 illustrates an air flow path within the rack and how air cooled by radiator 200 is transmitted to calculator 300.

Recently power consumption has been growing with increase of throughput of computers and communication devices and high-density packaging of parts. Under these circumstances, desktop computers (Personal Computer) and laptop computers have begun to employ a water cooling system for cooling air because of its highly efficient cooling and silence. With increase of power consumption, for example, by introducing blade servers, a large facility such as Internet Data Centers (IDC) have also begun to employ a water cooling system in a rack (water coolant is applied for each rack and air cooling is used inside of the rack) as shown in FIG. 10. FIG. 10 illustrates air flow path within the rack, and how air cooled by a radiator 200 is transmitted to a server 300 or other heat-generating electronic device.

A failure of the cooling system leads to thermal destruction of a system, but failure rate can be improved by using a duplex system in order to ensure reliability. However, a duplex water coolant facility results in cost increase. Among other things, piping in a building needs to be considered. To cope with these problems, the use of a thermal capacitor has been considered.

Figure 11:
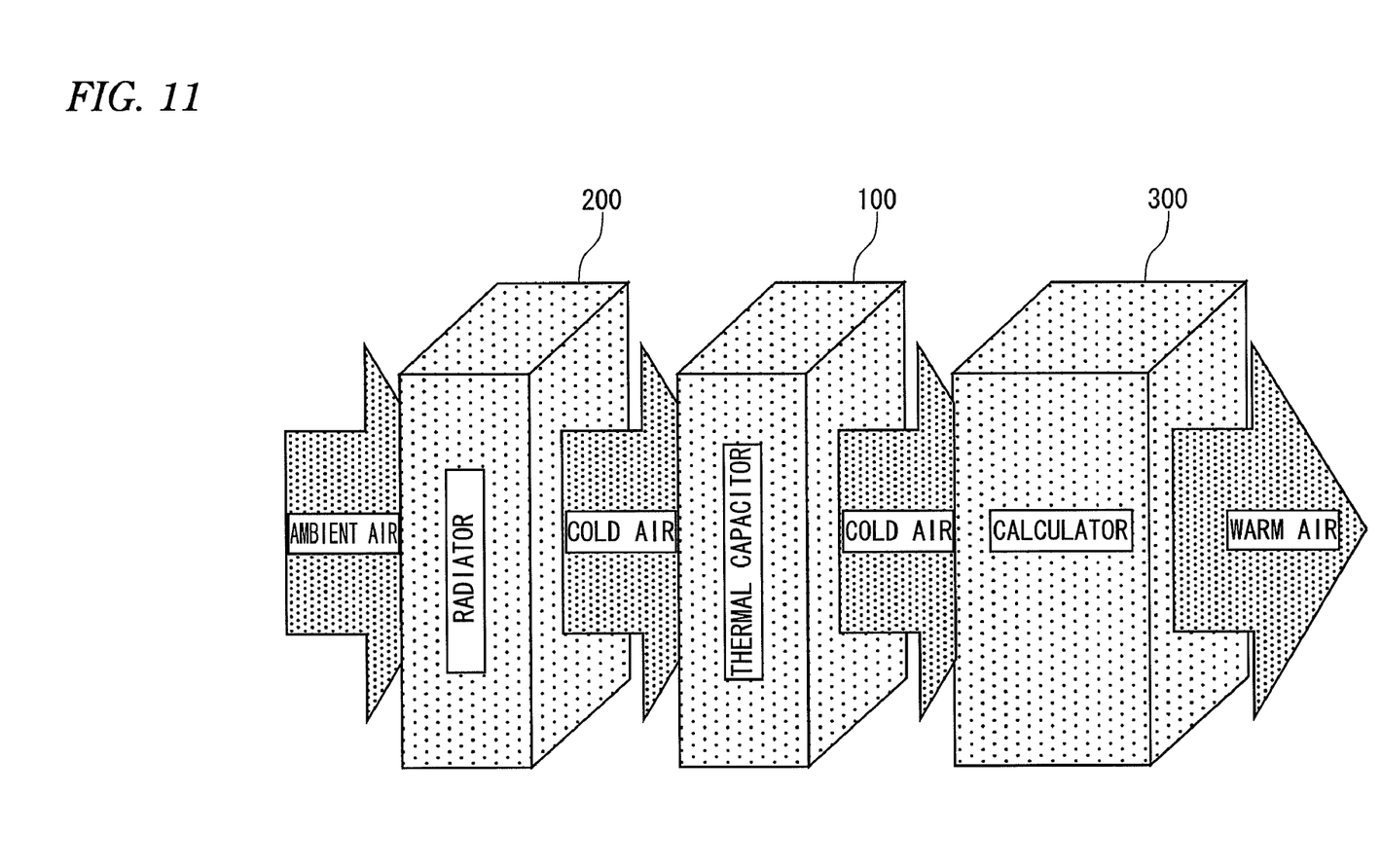
FIG. 11 illustrates conventional usage of a thermal capacitor.

As shown in FIG. 11, a thermal capacitor 100 here means an apparatus providing a structure capable of temporarily absorbing heat (cool air) similar to the capacitor of electrical parts and outputs air with constant temperature even if the temperature of the input air fluctuates.

By mounting the thermal capacitor 100 between a cooling apparatus (radiator 200) and an apparatus subject to be cooled (server 300), the apparatus will continuously be cooled for a specified time even when the cooling apparatus fails.

As a similar example for these technologies, cooling apparatus (Thermal capacitor 100) using a cooling material (CM) cooled, for example, by a refrigerator is known (e.g. Japanese Laid-open Patent Publication No. 2005-33150). However, a simple thermal capacitor 100 needs time to cool itself before starting cooling the server, so it takes time before cool air can flow from the output of thermal capacitor 100. In order to solve these problems, a method that forcefully outputs cool air by operating a fan at the start of cooling is known (e.g. Japanese Laid-open Patent Publication No. 3103603).

Cooling a large apparatus requires large cooling storage capacity so that cool air can be output for several hours even when radiator 200 fails. It is difficult for such large cooling apparatus to output cool air at the beginning of operation only by forced exhaust using a fan. Moreover, it is desirable that the thermal capacitor itself be a passive device as much as possible.

SUMMARY

A cooling storage device is mounted in an air flow path between a cooling apparatus and an entity subject to be cooled, and performs cooling storage using air cooled by the cooling apparatus.

The embodiments generally include cold insulation passages, fans, temperature sensors, and a control unit or control devices. The cold insulation passages each have a plurality of air flow channels obtained by dividing the air flow path into a plurality of air flow paths with different air flow path diameters. A fan is mounted in each air flow path and the fans control the air flow of each air flow channel.

A temperature sensor is mounted in each outlet of the cold insulation passages. When a detected temperature exceeds a predetermined temperature, the control unit or control devices control air flow so that the ratio of air flow by air flow passage with larger air flow path diameter to overall air flow of all air flow channel increases.

BRIEF DESCRIPTION OF THE DRAWING

FIGS. 5(*a*)-5(*d*) are perspective views illustrating another example of passages comprising the thermal capacitor.

FIGS. 7(*a*)-7(*d*) show an overall configuration of the thermal capacitor according to the second embodiment of this invention.

FIGS. 8(*a*)-8(*c*) are explanatory drawings illustrating operations of a slit.

DETAILED DESCRIPTION OF THE EMBODIMENTS

The First Embodiment

Figure 1:
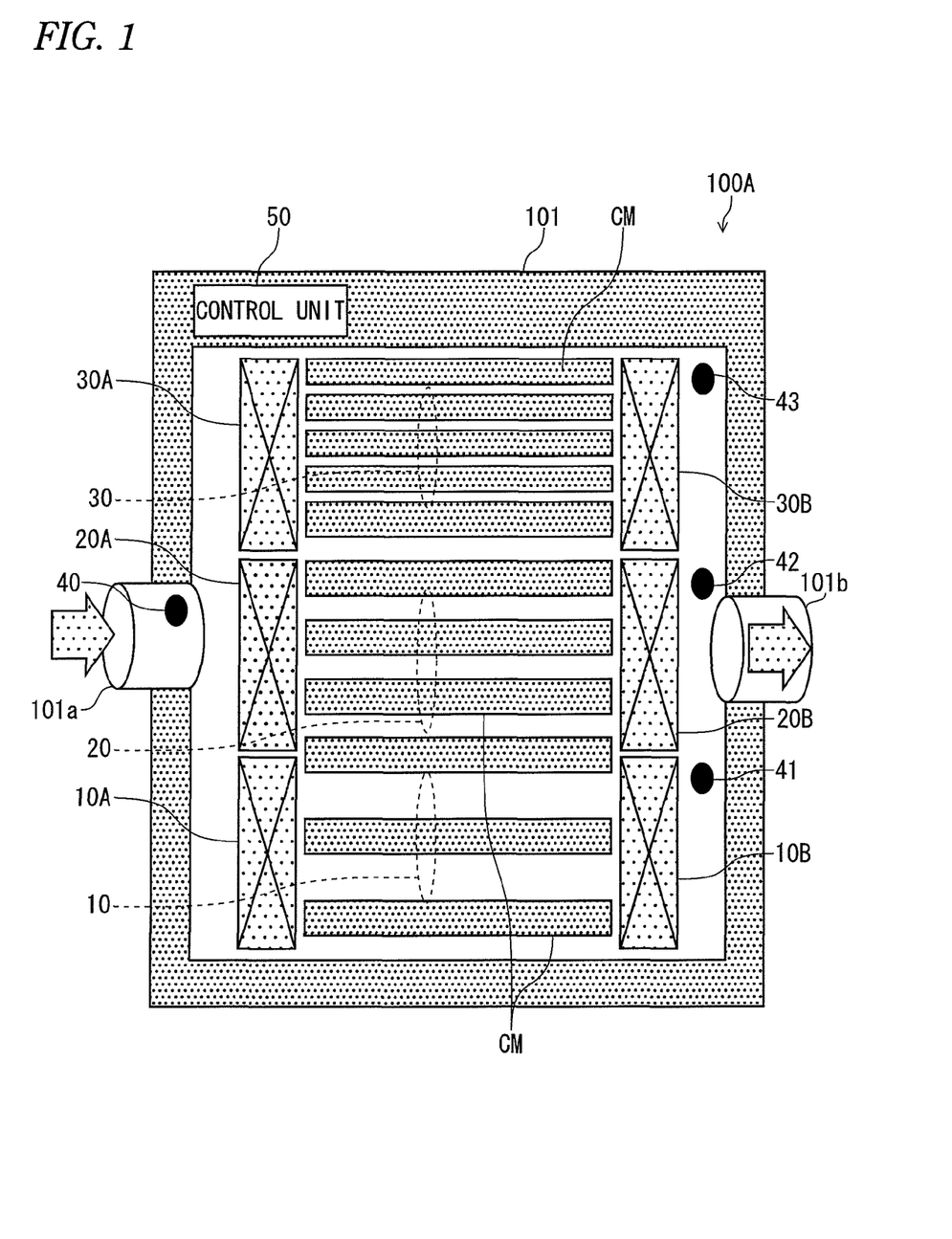
FIG. 1 is an overall configuration of the thermal capacitor according to the first embodiment of this invention.

The following embodiment is described referring to FIG. 1. A thermal capacitor of this embodiment is mounted in air flow path AF by longitudinally placing a radiator 200 within a rack 400, where a calculator 300 such as a server apparatus is located. The thermal capacitor cools air, which in turn thereby cools the calculator 300.

Thermal capacitor 100A shown in FIG. 1 includes an enclosure 101 supporting the thermal capacitor 100A, a cooling material CM and a plurality of air flow channels 10, 20, and 30 formed by separating air flow path AF into a plurality of air flow paths. The cooling material CM can be made of a polymer gel.

The air flow channels 10, 20, and 30 produce different resistances to each air flow fan 10A, 10B, 20A, 20B, 30A, and 30B preceding and subsequent to each of the air flow paths. The fans control air flow flowing through the air flow channels.

The thermal capacitor 100A is connected to air inlets 101*a* and 101*b* provided by enclosure 101. The thermal capacitor 100A also has a temperature sensor 40 detecting the temperature of the air taken into each air flow channel 10, 20, and 30 by detecting the temperature of the air flow from radiator 200 to the thermal capacitor 100A. The thermal capacitor 100A also has a plurality of temperature sensors 41, 42, and 43 detecting temperature of air after it has passed through the thermal capacitor 100A. A control unit 50 controls air flow rate through the air flow paths 10, 20 and 30 by controlling fans 10B, 20B, and 30B based on the air temperatures detected by the temperature sensors 41, 42 and 43.

Airflow resistance in the air flow channels 10, 20, and 30 is configured so that the amount of resistance is progressively smaller of Air flow channels 10, 20 and 30, respectively. Air flow channels 10, 20, and 30 are configured so that the heat capacity becomes smaller from the path 10, to the path 20, and to the path 30, depending on the amount of cooling material. This means that air flow channel 10 has the lowest airflow resistance and thermal capacity, while the air flow channel 30 has the largest air flow resistance and thermal capacity. The resistance and thermal capacity of air flow channel 20 are in between those of channels 10 and 30.

The air flow path of each the flow channels 10, 20, and 30 can be formed either by configuring a plurality of slits using cooling material (CM), or by providing a pipe structure. In this case, each the air flow channels 10, 20, and 30 are formed by a plurality of flow paths, however an air flow channel with one flow path is acceptable as well. In this example, the cross-sectional area of flow path comprising each of the air flow channels corresponds to air flow resistance. Then, when the radiator started, the thermal capacitor will more quickly be ready to begin cooling.

A control unit 50, when performing cooling storage for the thermal capacitor 100 A, (for example when starting to perform cooling storage) controls air flow so that air flow of the air flow channel 10 (with the smallest air flow resistance) is larger than the flow through other the air flow channels 20 and 30, when the temperature is the highest among the plural various temperatures (levels of temperature are determined by the number of air flow channels and in this example they are high, middle, and low). These multilevel temperatures are essentially the temperatures output by the thermal capacitor 100A.

When performing cooling storage, control unit 50 activates a fan at an air flow channel with larger air flow resistance, opens the air flow channel, and uses the air flow channel as the temperature lowers depending on the above mentioned temperatures levels.

Moreover, the control unit 50 controls usage of flow paths so that different flow paths are used depending on the temperatures when the thermal capacitor 100 is used to cool (absorbs heat). More specifically, the control unit 50 uses the air flow channel 30 with the largest air flow resistance compared with the flow channels 10 and 20, when the temperature is the lowest, and uses the air flow channel with lower air flow resistance as the temperature rises.

The control unit 50 can detect whether the thermal capacitor 100A is performing cooling storage or cooling itself by the temperatures obtained at the temperature sensor 40 mounted to the inlet of the thermal capacitor 100 A and at Temperature sensors 41, 42, and 43 mounted to the outlet of each air flow channel.

More specifically, the control unit 50 detects when cooling storage is performed by detecting that the air temperature at the outlet of the thermal capacitor 100A is higher than that of the inlet, and preparing to cool by detecting that an air temperature at the outlet of the thermal capacitor 100 A is lower than that of the inlet. When the inlet and the outlet air temperature are the same, the control unit 50 can detect that operation is performed under constant (stable) temperature.

For controlling cooling storage, the control unit 50 can be configured to operate (detect) for a certain time after activation of a radiator, and the control unit 50 can be configured to operate (detect) for a certain time after a failure or a halt of a radiator.

Figure 3:
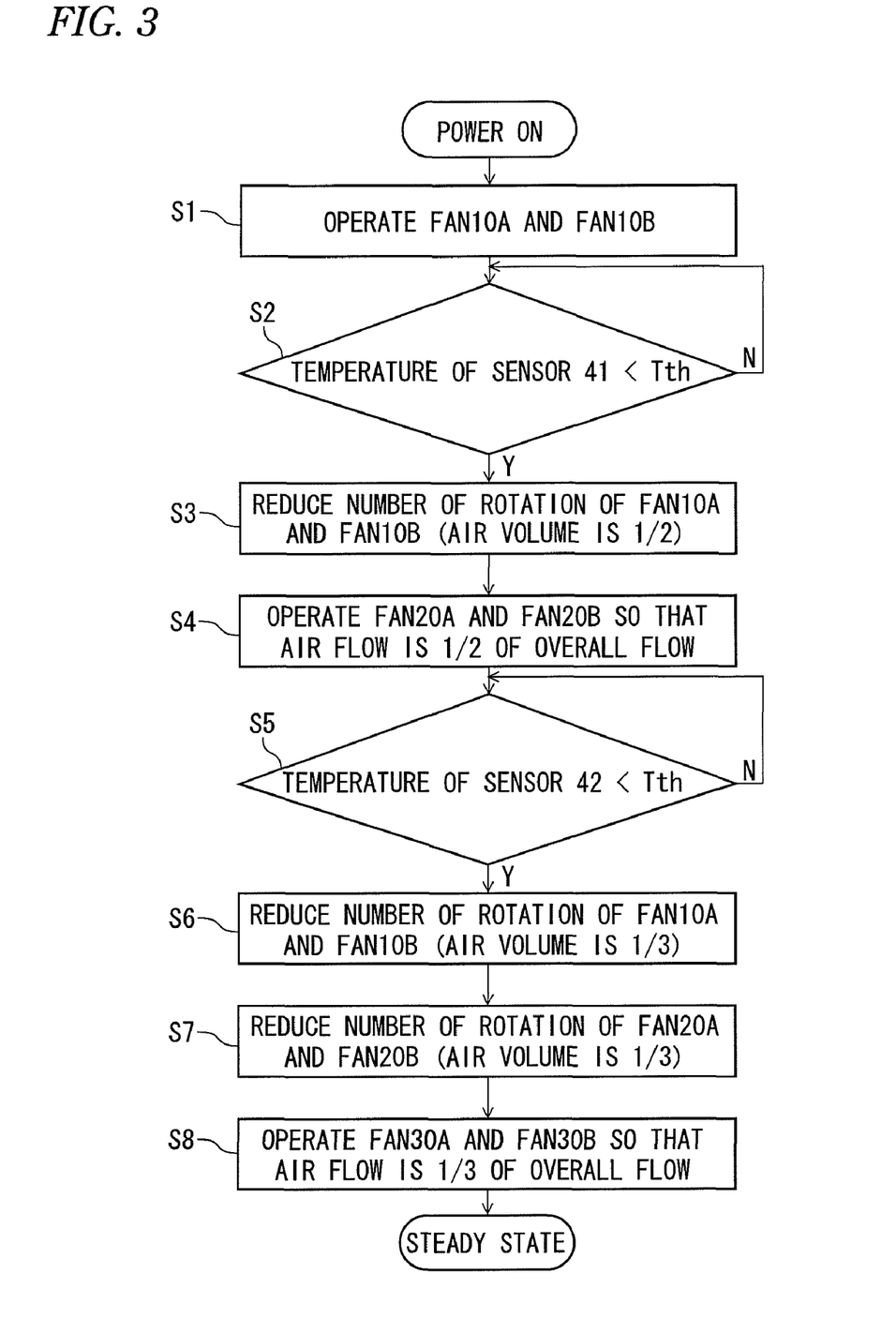
FIG. 3 is a flowchart showing one example of operation of the control unit.

Operation of the control unit 50 when performing cooling storage in this embodiment is explained using the flow chart in FIG. 3.

First, the control unit 50 operates the fans 10 A and 10B to cause air to pass through the air flow paths (passage 10) having lower resistance when powering on and the inside is not cooled (when the air temperature at the outlet of the thermal capacitor is the highest among levels of temperatures or for predetermined time after powering on). This control outputs cooled air as directly as possible from radiator 200 (Step S1).

Next, when the control unit 50 detects that the outlet temperature of air flow channel 10 is lower than a predetermined temperature Th by temperature sensor 41 (when air temperature output by thermal capacitor has reached a medium level) (Step S2, Y), the control unit 50 operates fans 20 A and 20B to cause air to pass through the air flow paths 20 with a slightly larger air resistance, thereby controlling cooling storage of the thermal capacitor in the air flow channel 20 (Steps S3, S4).

Moreover, when the control unit 50 determines that the outlet temperature of air flow paths 20 is lower than a predetermined temperature Th at the temperature sensor 42 as a result of cooling of the thermal capacitor of the air flow channels 10 and 20 (when the air temperature at the outlet of the thermal capacitor reaches the lowest level (Step S5, Y), the control unit 50 operates fan 30A and 30B, thereby cooling air flow channel 30 (with larger air resistance) (Step S6, S7, and S8). The control unit 50 also controls the output of cool air so that constant cool air flows from the output.

As one example, the control unit 50 performs controls as shown in FIG. 3. More specifically, the control unit 50 causes all air volume to pass through the air flow channel 10 because only the fans 10 A and 10B operate at the start (the highest temperature level) (Step S1). When cooling storage is applied to the air flow channel 10 (medium level of temperature) and then the fan 20A and 20B begin to operate, the control unit 50 controls the fan speeds so that air flow passing through the air flow paths 10 (the fan 10A and 10B) is ½ and that passing the air flow paths 20 (the fans 20A and 20B) is ½ of the total respectively (Steps S3 and S4).

Furthermore, when cooling storage is applied to the air flow channel 20 (at the lowest temperature level), and then the fans 30A and 30B begin to operate, the control unit 50 controls the system so that air flow passing the air flow channel 30 (fans 30A, and 30B) is ⅓, that of the air flow channel 20 (the fans 20A and 20B) is ⅓, and that of the air flow channel 10 (the fan 10A and 10B) is ⅓ of the total respectively (Steps S6, S7, and S8).

As explained above, in this embodiment when cooling storage is applied to the thermal capacitor 10A, control unit 50 controls the fan 10A, 10B, 20A, 20B, 30A, and 30B respectively depending on the air temperatures at each the air flow channels. The control unit 50 also controls air flow so that the ratio of air flow through the air flow path 10 (with smaller resistance relative) to overall air flow passing through all passages increases when temperature is higher. These controls by the control unit 50 produce output of constant cool air flow immediately after activation of the thermal capacitor.

Figure 4:
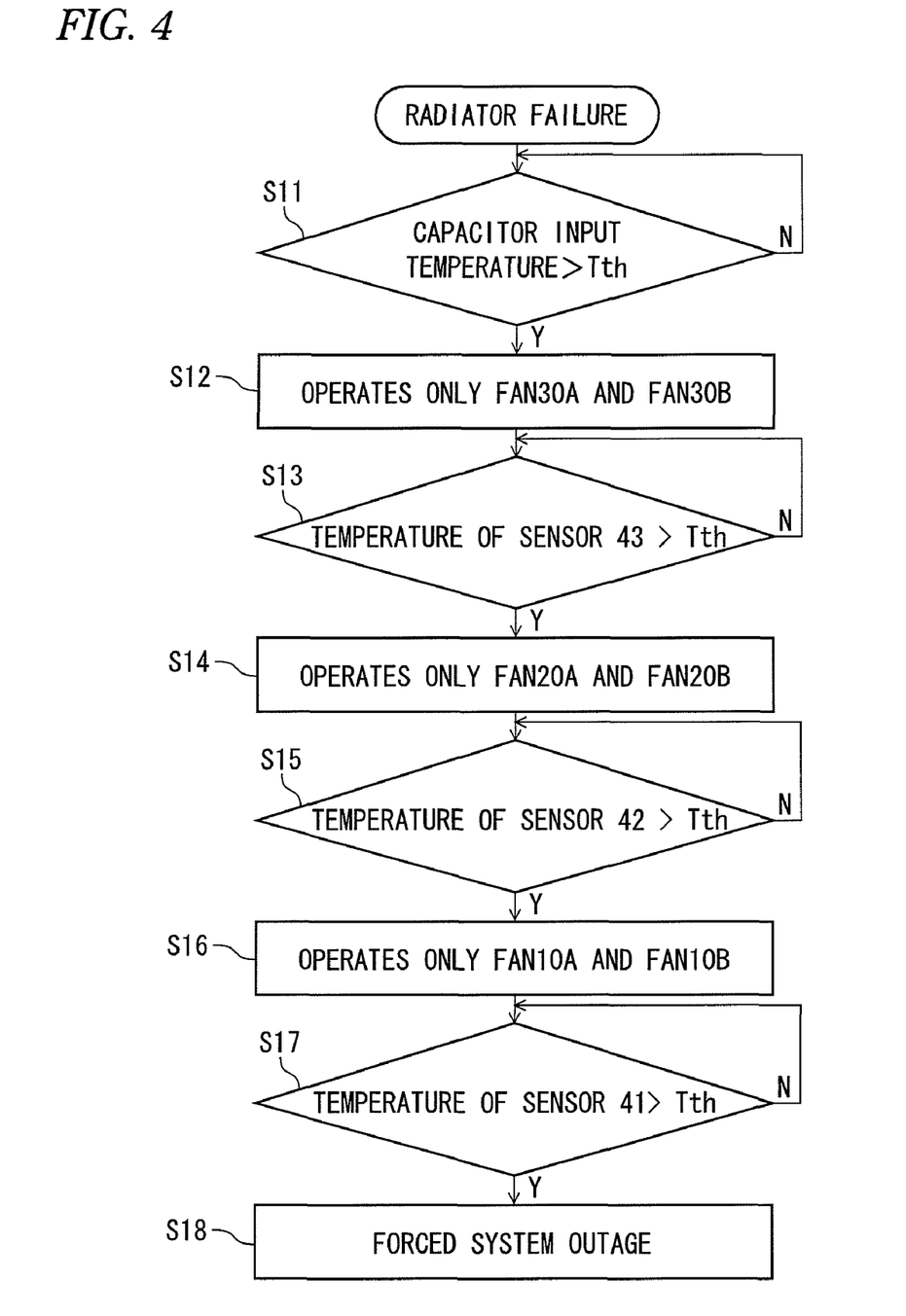
FIG. 4 is a flowchart showing other example of operation of the control unit.

Operation of the control unit during a radiator failure is shown in FIG. 4.

The control unit 50 detects temperature rise of incoming air by monitoring the temperature sensor 40 located at the input of the thermal capacitor 100A (Step S11, Y). The temperature rise indicates that a radiator failed, which leads to temperature rise of the incoming air. In this case, the control unit 50 only operates the fan 30A, and 30B (Step S12) to cool through air flow channel 30. When the control unit 50 detects that the temperature measured by sensor 43 exceeds the predetermined temperature Th after cooling air flow channel 30 (Step 13, Y), the control unit 50 operates the fans 20 A and 20 B (Step S14) for cooling through the air flow channel 20.

When the control unit 50 detects that the temperature detected by sensor 42 exceeds the predetermined temperature Th after air flow channel 20 has performed cooling (Step S15, Y), the control unit 50 operates the fans 10A, and 10B (Step S16), thereby causing the air flow channel 10 to provide cooling. After that, if the control unit 50 detects that the temperature measured by sensor 41 exceeds a predetermined temperature Th (Step S17, Y), the control unit 50 terminates the system forcefully (Step S18).

This embodiment allows constant cool air to be output as much as possible by controlling the air flow passing each fan when a radiator fails, by releasing cool air from the thermal capacitor.

Figure 5:
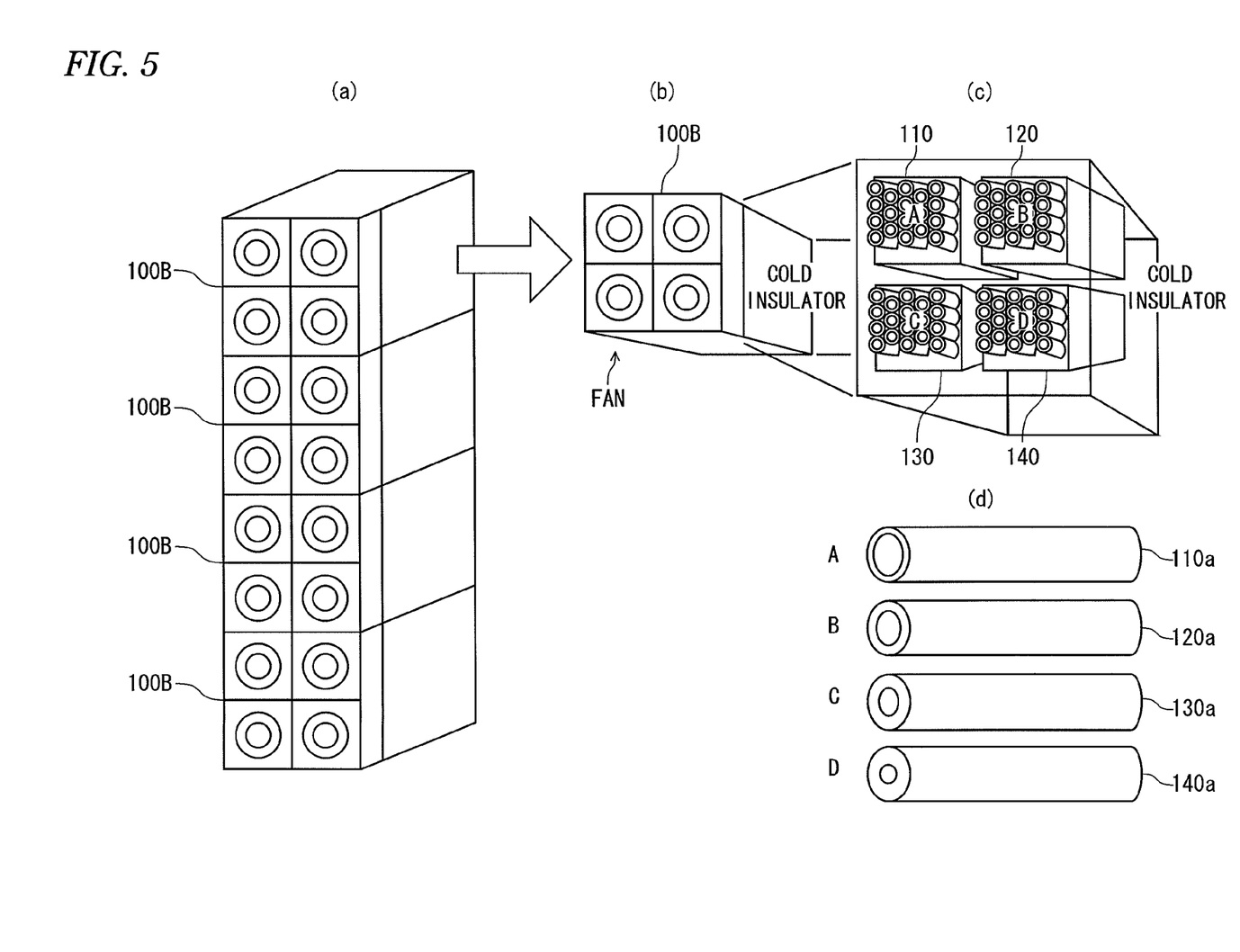

FIG. 5 is a perspective view illustrating another example of passages within the thermal capacitor.

In this example, an air flow path within a rack is divided into four by using four thermal capacitors (FIG. 5 (*a*)), and each thermal capacitor is further divided into four air flow channels (FIG. 5 (*b*), FIG. 5(*c*)) and each passage is comprised of flow paths with a plurality of pipes formed by cold insulation material (FIG. 5 (*d*)).

Moreover, the fans (not shown) are set up at each entrance and exit of air flow channels 110-140 as in the first embodiment.

These fans are controlled according to the size of the channel as in the first embodiment. As a result, the effect similar to the first embodiment is achieved.

The diameters of the pipes differ depending on each air flow channel, and air resistances are classified into four levels from large to small. It is apparent that the number of passages and the shapes are not limited by this invention.

Figure 2:
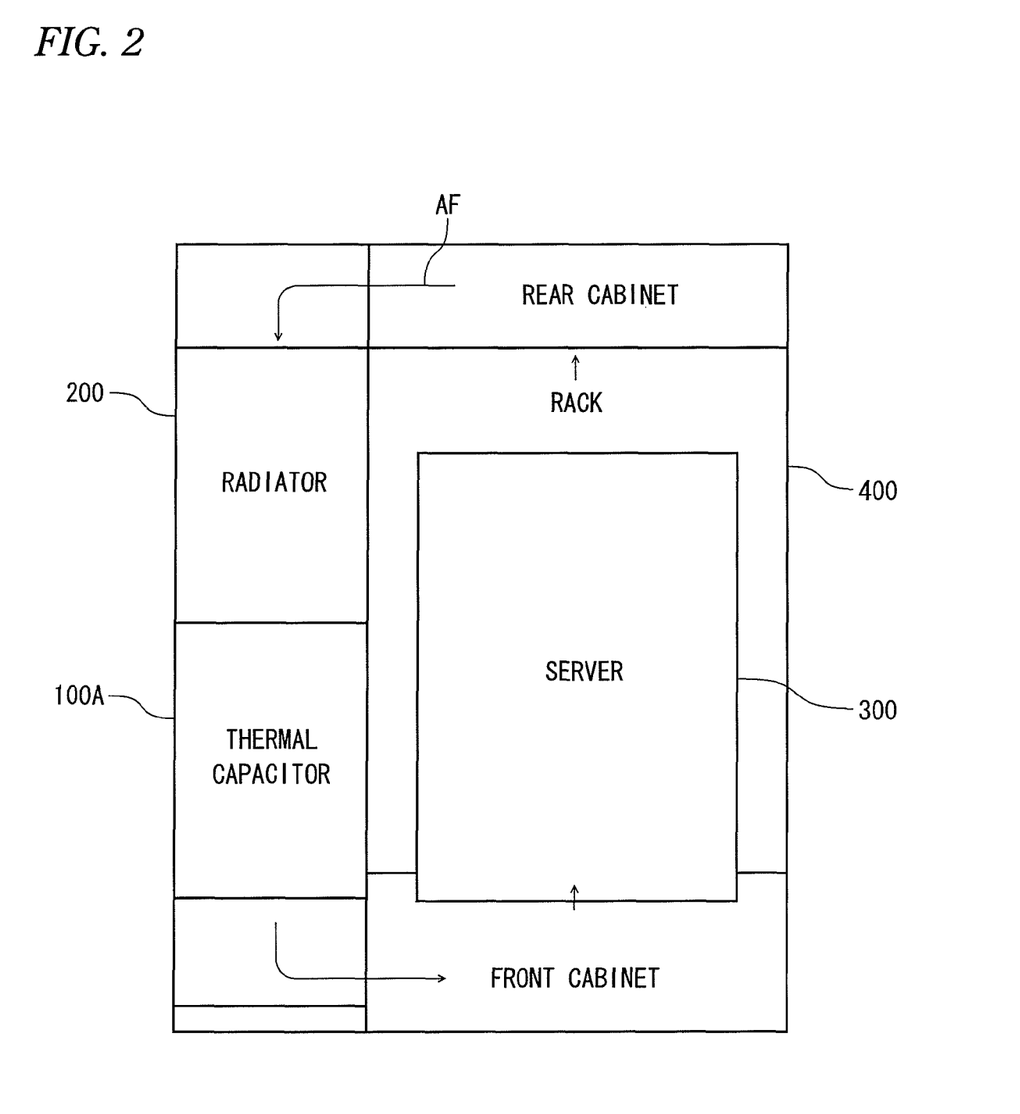
FIG. 2 is a plan view of a rack structure of server apparatus where the thermal capacitor is mounted.
Figure 6:
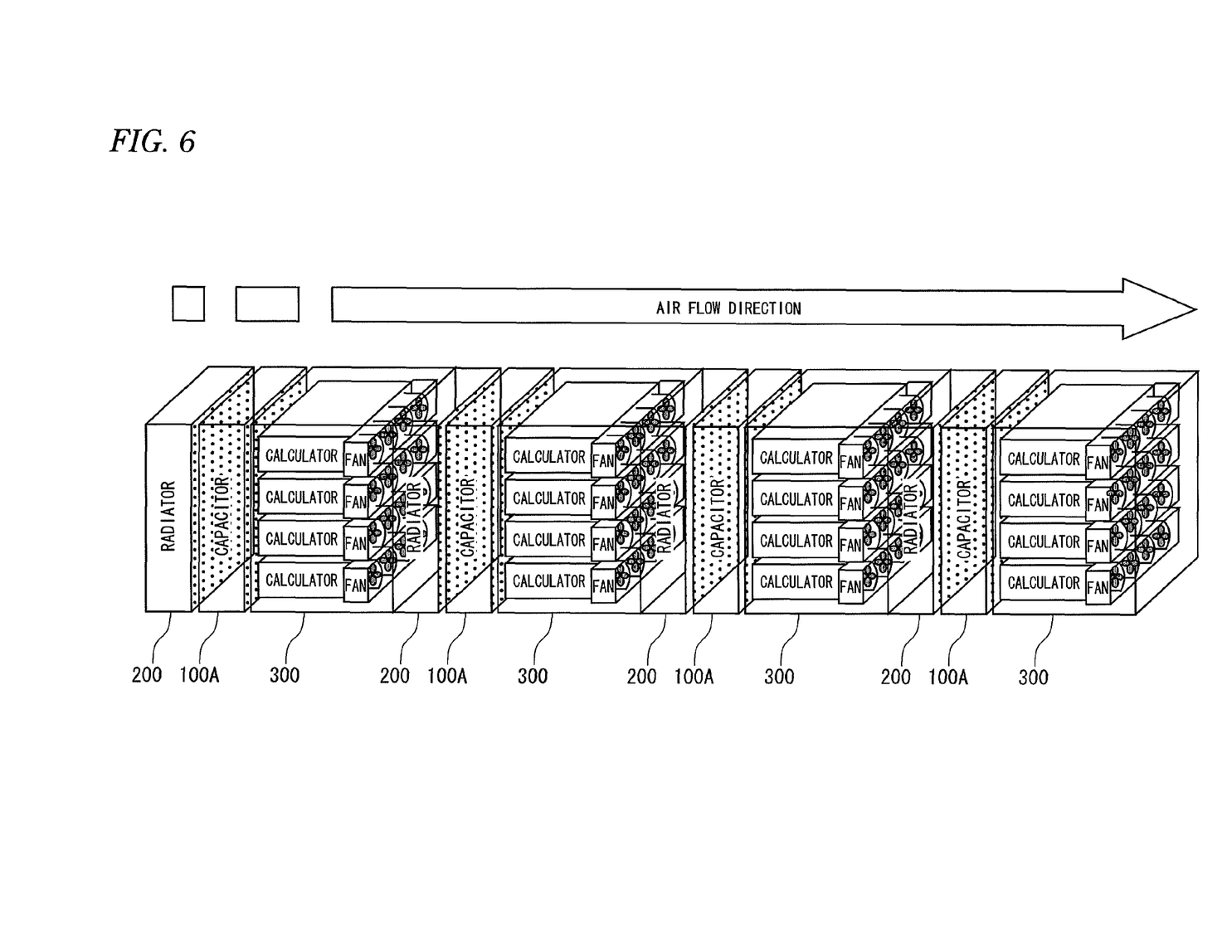
FIG. 6 is a perspective view illustrating other example of the rack structure.

FIG. 6 is a perspective view illustrating another example of the rack structure. In FIG. 2, an example is explained in which a single radiator 200 and a single capacitor 100A are mounted longitudinally in one rack. A plurality of pairs of radiators 200 and capacitors 100A can be placed longitudinally, as shown in FIG. 6.

The Second Embodiment

In the second embodiment, a thermal capacitor with simple design and higher reliability is described. This embodiment has slits using thermally deformable material, thereby eliminating the need for a fan or a control circuit.

Figure 7:
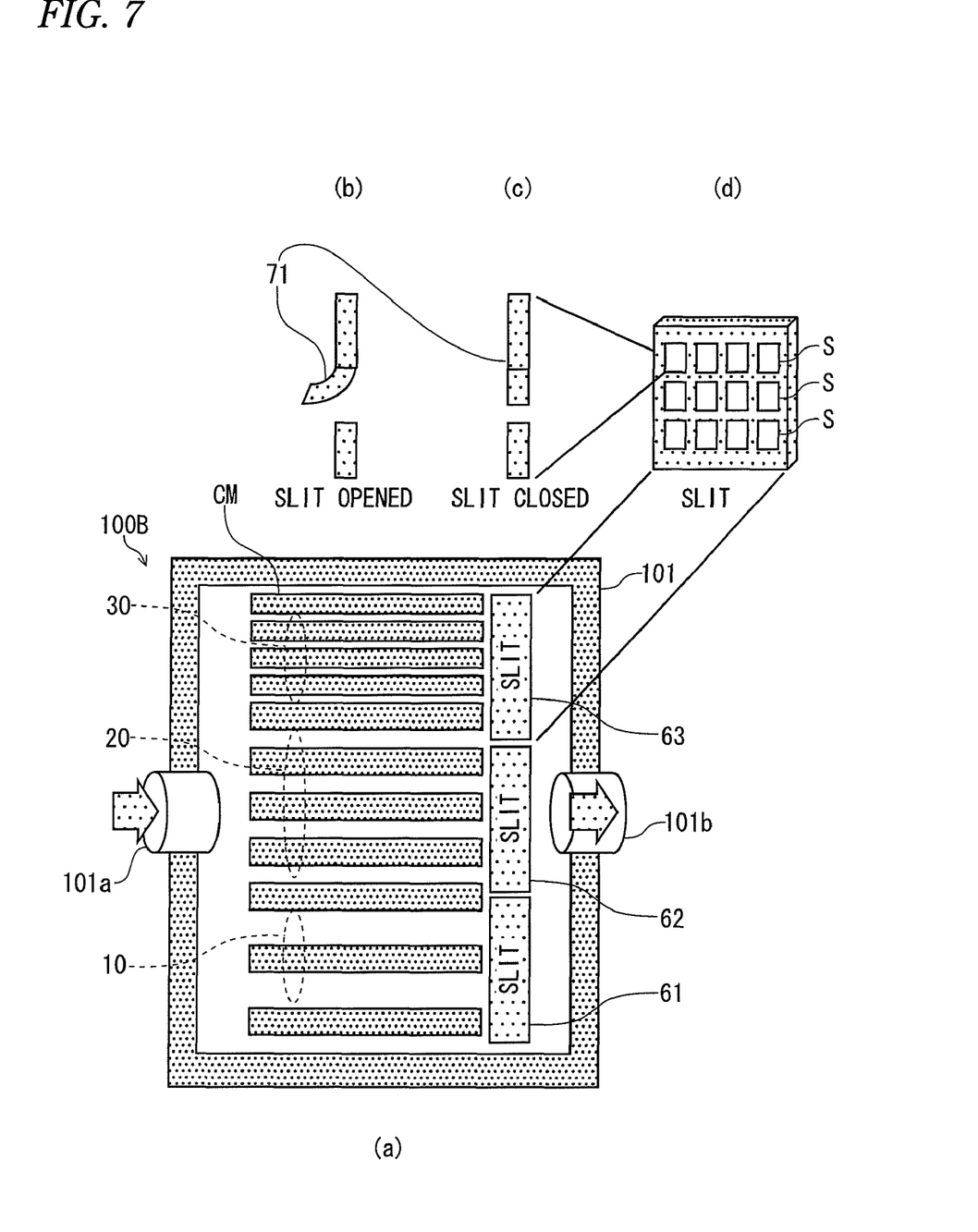

FIG. 7 illustrates the overall configuration of the thermal capacitor according to the second embodiment of this invention. The second embodiment provides windows 61, 62, and 63 made of thermally deformable material (e.g. shape memory alloy 71) to block of the air flow channels 10, 20, and 30 with different airflow resistances through the cooling material (CM). In FIG. 7, FIG. 7 (*a*) is a side elevation view of the second embodiment, FIG. 7 (*b*) is a side elevation view with one slit opened while FIG. 7 (*c*) is a side view with one slit closed. FIG. 7 (*d*) is a front view of the slits in windows 61, 62, and 63.

A plurality of slit S in the windows 61, 62, and 63 are provided to correspond to a plurality of air flow paths comprising each air flow channel. Each thermally deformable part folds to open windows when the temperature level is high (FIG. 7 (*b*)), whereas each thermally deformable part unfolds when they are cooled (low temperature level) (FIG. 7 (*c*)). The windows should not be blocked completely here to maintain some minimum air flow.

In this embodiment, windows 61, 62, and 63 with these slits are mounted to the outputs of the air flow channels 10, 20, and 30 with different airflow resistances within the thermal capacitor. When the inside of the thermal capacitor 100B is not cooled, slits S of the windows 61, 62, and 63 are opened and the air flow resistance is defined by the interval (structure) of the cooling material (CM).

When the air flow channel 10 is cooled, the memory shape alloy (thermally deformable part) blocks a window of an air flow paths (slit), thereby increasing air resistance. This causes cool air flow into the air flow channel 20, thereby causing the airflow path 20 to be cooled. Moreover, when the air flow path 20 is cooled, the memory shape alloy of the air flow path 20 blocks the slit, and then cool air is flows into the air flow path 30. Finally all passages are cooled.

This configuration allows control without providing a fan or a control circuit, and enables the output of cool air even at the starting operation. Moreover, by associating a passage width with a slit width, it is possible to control cool air released by the thermal capacitor during radiation failure. In the above configuration, the windows 61, 62, and 63 and their slits comprise air flow control unit of the second embodiment.

Figure 8:
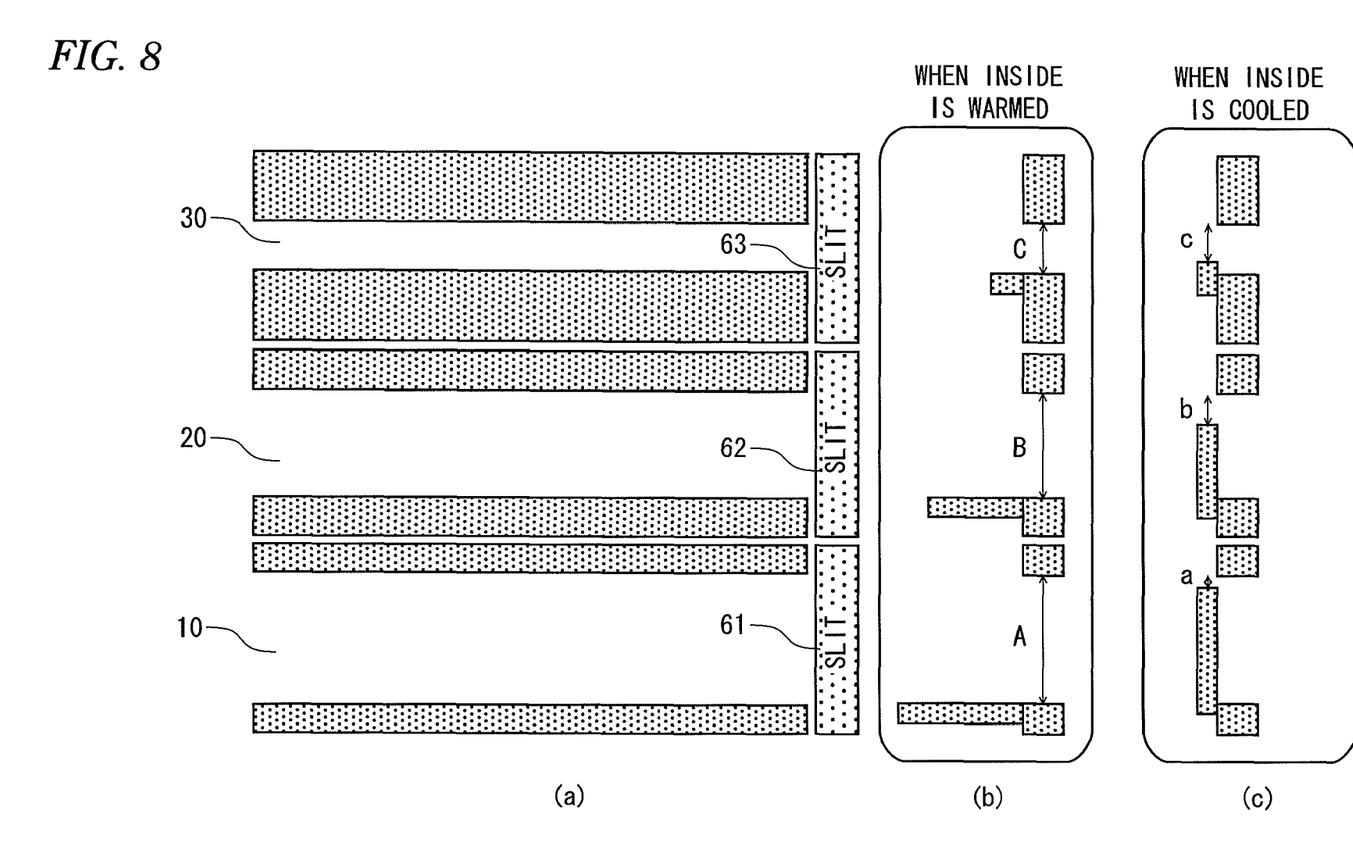

Referring how to FIG. 8, suppose that the widths of air flow channels 10, 20, and 30 are A, B, and C respectively, and that the width when slits of the windows 61, 62, and 63 are opened are A, B, C as well. On the other hand, the width when the slits of the windows 61, 62, and 63 are closed are a, b, and c respectively.

At this time, the relationship of the width of air flow channels as below is applied:

A>B>C>=c>b>a

Figure 9:
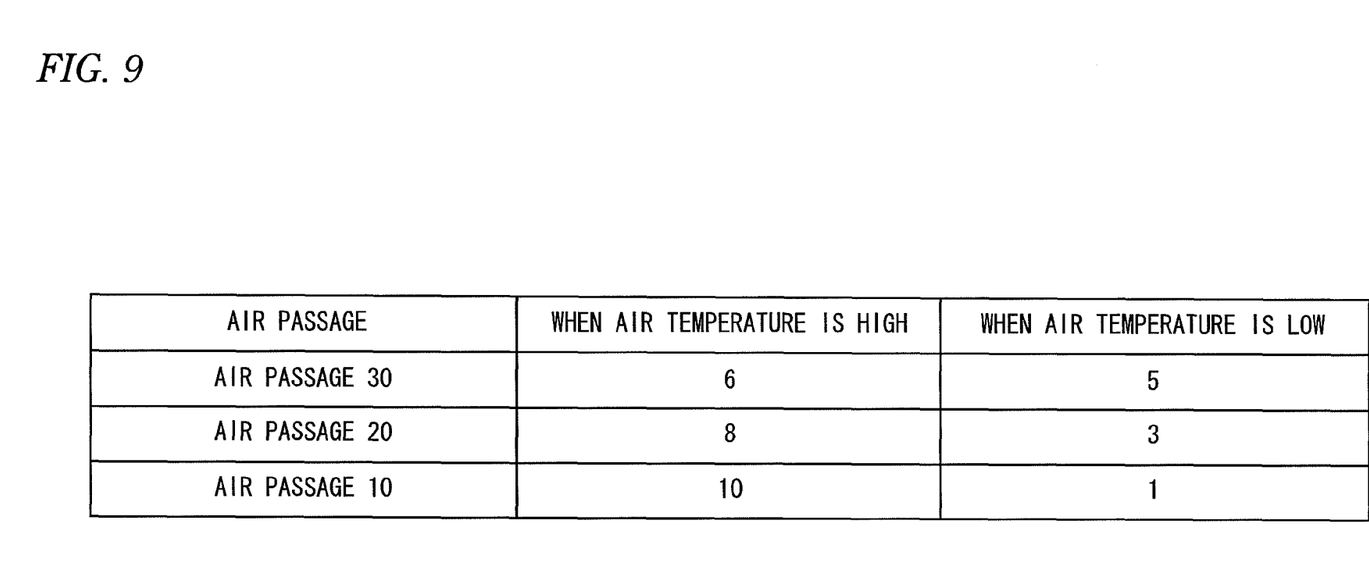
FIG. 9 is a table showing one example of width of each passage, width of a slit when a window is opened and a space of each slit when the window is closed.

FIG. 9 shows an example of each passage width, the slit width when the window is opened, and the slit space when the window is closed. The configuration of this embodiment allows air flow control by utilizing air resistance between cooling materials when the inside is not cooled, for example, at the starting operation, and by utilizing the slit space of a window, when the inside is sufficiently cooled.

As explained the above, according to this embodiment, at least for two levels of temperatures: high and low, when air temperature at each air flow channel is low, an opening of Air flow channel 10 with small air flow resistance is controlled more than openings of Air flow channels 20 and 30, thereby changes air flow resistance of each air flow channel. This enables output of constant cool air even during operation of standing to cool, because cool air absorbed in passage 30 is released first when a radiator fails with the inside is sufficiently cooled, and cooled air is released from a thermal capacitor.

These embodiments control the air flow by the fans or the slits.

However, the control is not limited to this.

For example the air flow paths are made from the shape-memory alloy, and they control the air flow by transforming at the temperature.

What is claimed is:

1. A cooling storage device mounted in an air flow path between a cooling apparatus and an entity subject to be cooled comprising:

a passage comprised of a plurality of air flow paths with different air flow diameters obtained by separating said air flow paths into a plurality of air flow channels, the channels being made of material that is cooler than the temperature of air heated by the entity;

a fan mounted to each air flow channels of said passage and controls air flow flowing into each air flow channels;

a temperature sensor mounted an outlet side of said cold insulation passage; and a control unit controlling air flow so that the ratio of air flow through air flow channels with larger air flow path diameter to overall air flow of all of the air flow channels increases when a detected temperature by said temperature sensor exceeds a predetermined temperature.

2. A cooling storage device according to claim 1, wherein said control unit controls output of each fan so that air is output using an air flow channel with smaller air flow path diameter as the temperature detected by said temperature sensor lowers.

3. A cooling storage device according to claim 1 further comprising:

at least a first temperature detection unit detecting air temperature at an outlet of each air flow channels, said control unit outputting air using an air flow channels with smaller air flow path diameter based when a temperature detected at said temperature detection unit reaches a predetermined temperature.

4. A cooling storage device according to claim 1, when said cooling storage device is used to cool, said control unit outputs air using an air flow paths with larger cross-sectional areas as the temperature rises.

5. A cooling storage device according to claim 1, wherein said plurality of air flow paths have smaller thermal capacity as the diameter of air flow path becomes larger.

* * * * *